United States Patent [19]
Baumann

[11] 3,864,794
[45] Feb. 11, 1975

[54] APPARATUS FOR SLITTING AND OPENING A KNIT TUBE

[76] Inventor: Heinz Baumann, Falkensteinstr. 5a, Augsburg, Germany

[22] Filed: Nov. 14, 1973

[21] Appl. No.: 415,765

[30] Foreign Application Priority Data
Nov. 7, 1972 Germany............................ 2254371

[52] U.S. Cl..................................... 26/55 C, 83/365
[51] Int. Cl. ........................... D06h 7/08, D06c 5/00
[58] Field of Search........ 26/55 R, 55 C, 56; 83/365

[56] References Cited
UNITED STATES PATENTS

| 534,641 | 2/1895 | Tullar ...................................... 26/56 |
| 625,169 | 5/1899 | Johnston................................. 26/56 |
| 1,964,691 | 6/1934 | Shippling...................... 26/55 C UX |
| 3,317,951 | 5/1967 | Hureau .................................... 26/56 |
| 3,776,077 | 12/1973 | Letsche......................... 26/55 C UX |

FOREIGN PATENTS OR APPLICATIONS

| 1,181,847 | 1/1959 | France .............................. 26/55 R |
| 1,334,402 | 7/1963 | France ............................... 26/55 C |
| 463,275 | 3/1937 | Great Britain ...................... 26/55 R |

*Primary Examiner*—Robert R. Mackey
*Attorney, Agent, or Firm*—Karl F. Ross; Herbert Dubno

[57] ABSTRACT

An array of flexible fiberglass bars bridge a pair of axially spaced disks which are rotatable about their axis. A compound screw at the axis has its threaded regions connected to the two support disks so that it can be rotated to alter the maximum diameter of the array. A motor is provided to rotate the array and the disks about the axis in accordance with instructions received from a scanner which senses a rib of a knit tube that is pulled axially over the array. A cutting device is mounted to one side of the region of maximum diameter and has a straight guide directed tangentially at this region. Diametrically opposite this cutting device is an opening takeoff cross whose lower end is similarly directed tangentially at the wide region. Linkages are provided to insure that the cutter guide and the end of the cross are always directed tangentially regardless of the diameter of the array.

10 Claims, 2 Drawing Figures

APPARATUS FOR SLITTING AND OPENING A KNIT TUBE

FIELD OF THE INVENTION

The present invention relates to an apparatus for opening up a knit tube. More specifically this invention concerns a apparatus which splits a tube of fabric as it issues from a circular knitting machine.

BACKGROUND OF THE INVENTION

Circular knitting machines are often used to make flat textiles. To this end the knit tube produced by the machine is slit longitudinally to open it and allow it to be flattened. A device for carrying out this operation must be able to follow a rib of the tube with its cutter, since otherwise the fabric will be cut on the bias and unusable.

One known arrangement has a pair of parallel and relatively displaceable guide rods one of which is provided with a slitting blade. The spacing of the rods determine how much the tube is stretched, since it must be stretched for best slitting. One of the rods is provided with a rotatable guide head that is rotated in order to twist the tube around and keep the same rib under the slitting blade. Obviously this head must pull rather violently at the fabric to displace it, so that the likelihood of damaging the fabric is considerable.

It is also known to provide an umbrella-like arrangement having a plurality of arms which can be spread to stretch the tube. A cutting device is provided adjacent the open end of this guide to slit the fabric as it comes off. Since the ends of the arms move in an arc as the arms are displaced, it is necessary to provide a mount for the cutter that is displaceable in two directions so as to position it as closely as possible to the edge of the umbrella guide. In this manner adjustment is difficult, and the setting-up time for the machine is also considerable. The arms forming the guide are subjected to considerable bending force so that they soon deform and need replacement.

OBJECTS OF THE INVENTION

It is therefore an object of the present invention to provide an improved apparatus for opening up a knit tube.

Another object is to provide an apparatus of this type which is very easy to adjust and which presents virtually no hazard for the tube being continuously drawn over it.

SUMMARY OF THE INVENTION

These objects are attained according to the present invention in which a support is provided with an upper and a lower support disk which are displaceable toward and away from each other, but which always remain at and like distances from a central plane. An array of elongated flexible bar elements bridge the disks and are angularly equispaced about a vertical rotation axis passing through the support. Means is provided to rotate the entire array as well as its support about this axis so as to keep a cutting device which is non rotatable about the axis aligned with a single rib on the fabric. Mechanism automatically adjusts the cutting device so that its guide extends tangentially to the region of maximum diameter of the array.

According to another feature of this invention a compound screw is axially fixed in the support and extends along or parallel to the support rotation axis. One side of this screw is threaded into the upper support disk and the other side into the lower disk, so that rotation of the screw, which has like but opposite screw threads, displaces the two support disks oppositely. The adjustment of the maximum diameter of the array is made simply by rotation of this screw through an appropriate linkage.

The cutter may be carried on a nut threaded on a rod which is connected to the adjustment screw through a bevel gear so that rotation of this rod moves the cutter in a direction transverse to the rotation axis of the array. It is also possible to mount the cutter on a two-arm lever pivoted on the support arm for the array and with the cutter on the end of one arm and the end of the other arm biased to engage the upper support disk. In both cases displacement of the support disks effects displacement of the cutter to keep it aligned tangentially with the region of widest diameter of the array.

Such an arrangement is extremely robust. Since the flexible elements are secured cage-like at both ends their elastic limits are never exceeded and they never lose their shape. The adjustment can be carried out rapidly, even in the course of operation, with a single operation required to set the diameter of the array and to align the cutter.

DESCRIPTION OF THE DRAWING

The above and other objects, features, and advantages will become more readily apparent from the following description reference being made to the accompanying drawing in which.

SPECIFIC DESCRIPTION

Figure 1:
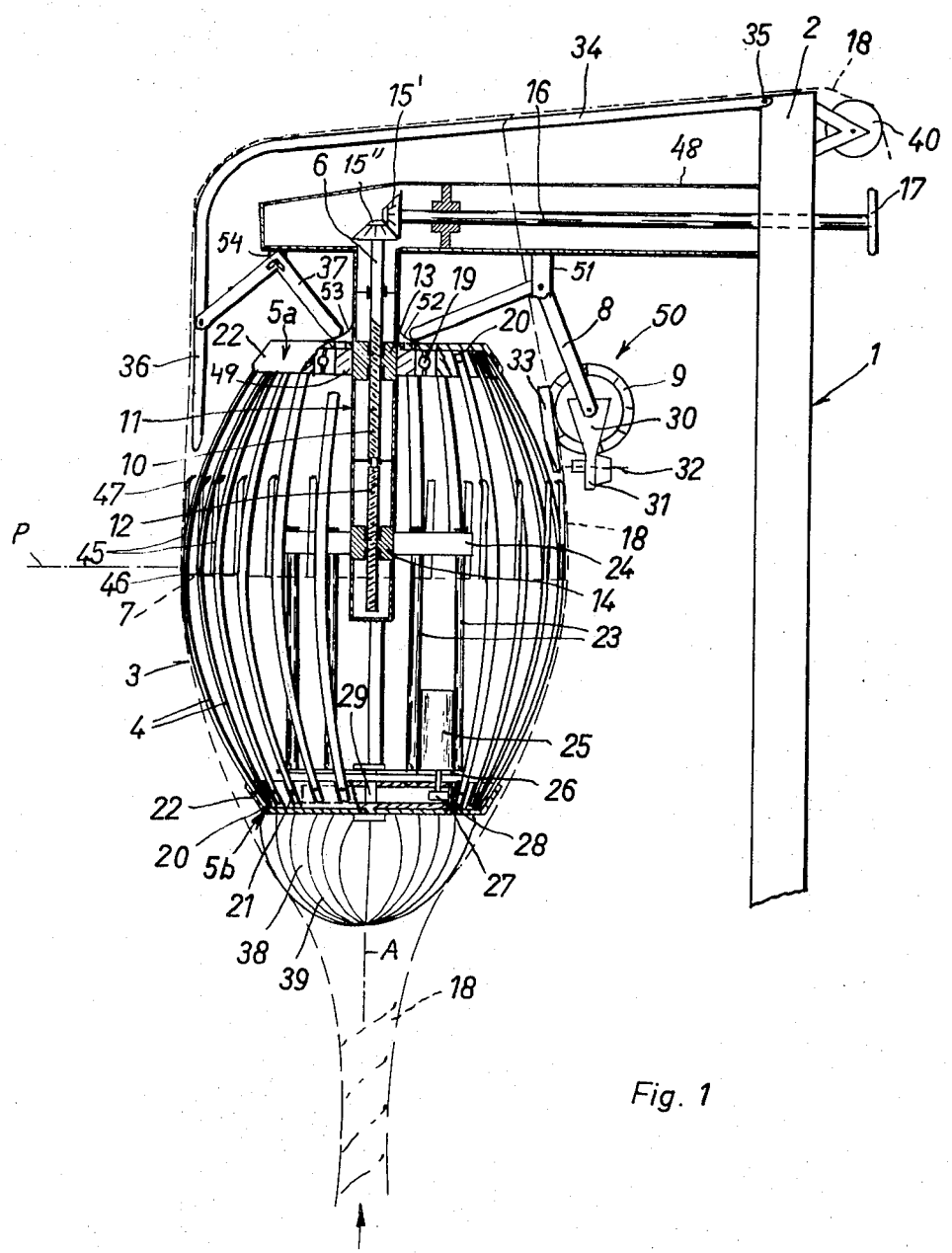
FIG. 1 is a side elevational view, partly in section, of the apparatus according to the present invention.

As shown in FIG. 1 an apparatus 1 for slitting and opening a tube 18 coming up from a circular knitting machine along an axis A has an upright support post 2 with a horizontal hollow arm 48 from which depends another hollow upright sleeve 11. A rod 16 is journaled in the arm 48 and has on its end projecting from the upright 1 a handwheel 17 and on its opposite end a bevel gear 15' which meshes with another bevel gear 15'' carried on the upper end of a shaft 6 journaled in the tube 11 to rotate about axis A. Thus rotation of the handwheel 17 will effect rotation of the rod 6.

This rod 6 is formed with an upper threaded region 10 and a lower threaded region 12 of identical pitch but opposite hand. Respective nuts 13 and 14 axially displaceable but non rotatable in the tube 11 are threaded on these regions 10 and 12 so that rotation of the rod 6 in one sense will move the nuts 13 and 14 toward each other, and vice versa. The tube 11 is slotted so that a hub 49 for an upper support 5a as well as a carrier plate 24 for a lower support 5b are axially connected to the nuts 13 and 14, respectively.

The supports 5a and 5b are bridged by a plurality of rectangular-section and angularly equispaced fiberglass bars 4 which form an array 3 having the shape of truncated elipsoid centered on the axis A. These bars 3 are set in notches 20 on the peripheries of supports and held in place by pins 21 and cover plates. The upper support 5a is rotatable relative to the axis A on a ball bearing 19 separating it from its hub 49. The lower support disk 5b is rotatable about axis A on a pin 29 secured in a plate 26 spaced from the nonrotatable carrier plate 24 by a plurality of axial bars 23. Thus the entire array 3 can spin about the axis A.

A motor 25 is mounted on the plate 26 and carries a pinion 27 which meshes with an internal gear 28 formed on the plate 5b, so that this motor can rotate the entire array in either direction about the axis A. The supply leads for the motor 25 run up through the tubes 11 and 48.

A cutting device 50 is arranged slightly above the central plane P of the array 3 and comprises a straight guide 33 which is directed tangentially to the array 3 at plane P and generally perpendicular to this plane P, and a slitting wheel 9. Both the guide 33 and the wheel 9 are carried on one end of a two-arm lever 8 which is pivoted at 51 on the arm 48 about a horizontal axis, and which has another end riding on a cam formation 52 on the upper support disk 5a. The bars 4 are provided at their centers with short ski-shaped guide elements 45 whose one ends 46 lie just at the plane P and whose other ends 47 are curved inwardly toward the axis A to prevent snagging of the tube 18. The end of the guide 33 is slightly above the ends 47 so that the tube 18 runs smoothly off these elements 45, which are parallel to the axis A, and into the guide 33.

Directly below the cutter 50 is a support 30 on which is mounted an optical sensor 32 that scans the tube 18 as it rises over the array 3 and gives an output whenever a particular rib or longitudinal part of the tube moves away from it. This scanner 32 is connected to the motor 25 so that the entire array 3 can be rotated and the tube 18 always cut along a particular rib or region extending along the warp. In this manner the tube is slit to produce straight goods.

To the diametrically opposite side of the array 3 from the cutter 50 is the lower pickup end 36 of an opening cross 34 which is pivoted about a horizontal axis at 35 on the upright post 2 and whose lower end is pivoted on one end of a two arm-lever 37 whose other arm is biased to ride on a cam 53 and which is pivoted at 54 like the lever 8. The cross 34 is generally L-shaped and, like the guide 33 its lower end 36 is aligned tangentially with the array 3 at plane P, which is its region of maximum diameter, so that the slit tube 18 feeds most smoothly off the apparatus 1. A long roller 40 rotatable about a horizontal axis is provided on the post 1 to lead the slit tube 18 off the device.

The lower support 5b is provided with a basket 38 of hemispherical shape that is formed of a plurality of flexible wires 39 so that as the tube 18 rises up and over the array 3 it is not snagged and is evenly stretched.

Figure 2:
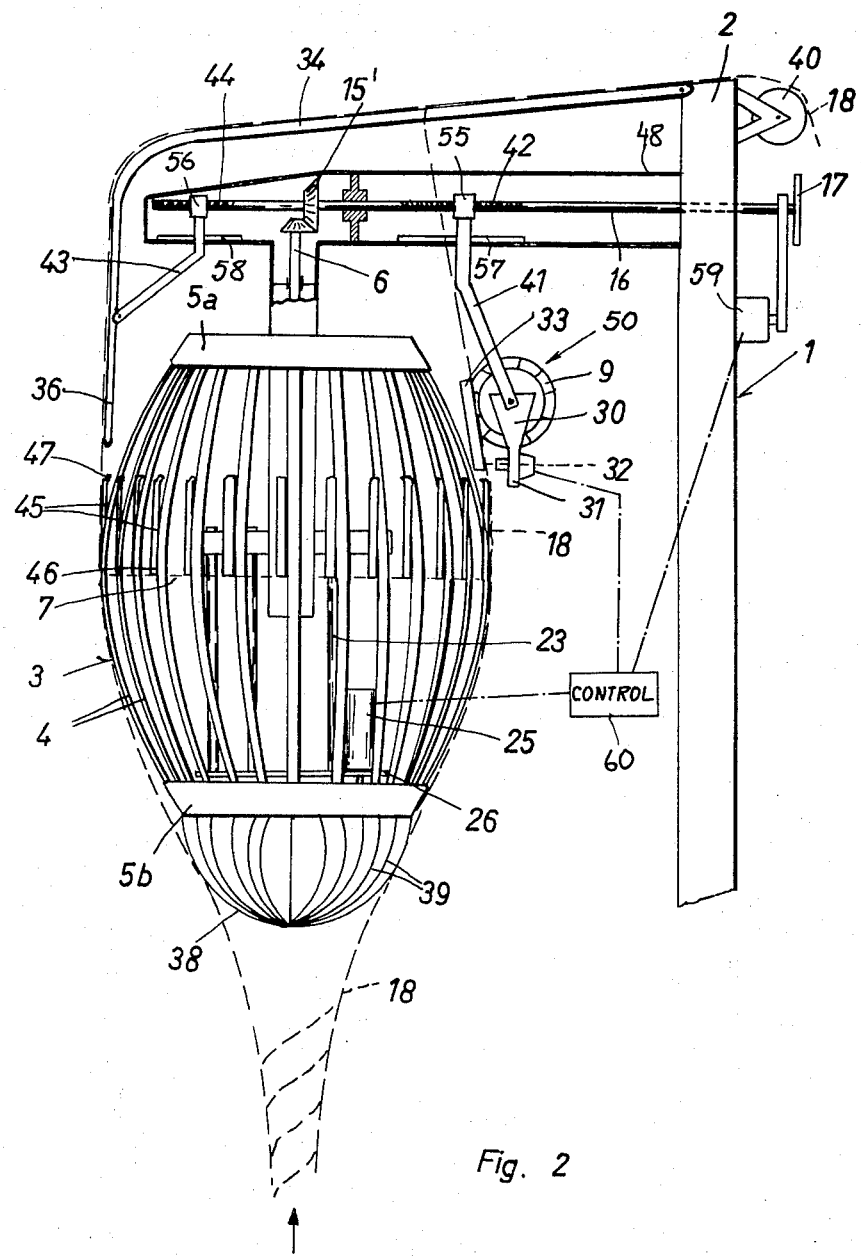
FIG. 2 is a similar view showing another configuration of the apparatus of this invention.

The arrangement shown in FIG. 2 is substantially identical to that of FIG. 1 except for the mounting of the cutter 50 and the opener 34. An arm 41 passes through a slot 57 in the tube 48 and has a nut 55 threaded on a threaded region 42 of the rod 16. Similarly an arm 43 passes through a similar slot 58 in the arm 48 and has a nut 56 riding on an oppositely threaded region 44 of the rod 16. The pitches of the regions 42 and 44 are not the same so that the lower end 36 and the guide 33 exactly follow the movement of the array 3. The decrease or increase in maximum diameter of the array 3 is not directly proportional to the increase or decrease in the spacing between elements 5a and 5b. A motor 59 can rotate the shaft 16 under command from a control circuit 60. Also connected to the control circuit 6 are the sensor 32 and the motor 25 operating as previously described.

I claim:

1. An apparatus for opening a knit tube advancing along an axis, said apparatus comprising:
    a pair of axially spaced supports rotatable about and centered on said axis;
    an array of like elongated flexible elements angularly equispaced about said axis and bridging said supports;
    means for displacing at least one of said supports axially toward and away from the other support thereby bowing said flexible elements and changing the maximum diameter of said array;
    cutting means for slitting a knit tube drawn axially over said array; and
    mechanism for directing said cutting means tangentially at the region of said array corresponding to said maximum diameter.

2. The apparatus defined in claim 1 wherein said means for displacing includes an adjustment member at said axis for displacing said supports toward and away from each other with said region remaining fixed.

3. The apparatus defined in claim 2 wherein said adjustment member is a compound screw having a pair of threaded regions threadedly engaging said supports.

4. The apparatus defined in claim 3 wherein each of said supports includes an axially displaceable but nonrotatable nut threaded on a respective threaded region of said screw.

5. The apparatus defined in claim 4 wherein said means for displacing further comprises another adjustment member projecting from said apparatus and linked to said screw to rotate same in either direction.

6. The apparatus defined in claim 1 wherein each of said supports includes an element with a circular periphery formed with a plurality of angularly equispaced notches each receiving a respective end of a respective element elongated flexible.

7. The apparatus defined in claim 1 wherein said cutting means includes a straight guide directable tangentially at said array and spaced axially from said region.

8. The apparatus defined in claim 7 wherein said mechanism includes a two-arm lever pivoted about a fixed axis and having one end carrying said cutting means and said guide and the other end operatively connected to one of said supports.

9. The apparatus defined in claim 7 including means for displacing said cutting means comprising a rotatable rod extending transverse to said axis and formed with a threaded region and said cutting means includes a support arm threadedly engaging said rod.

10. The apparatus defined in claim 1, further comprising an opening cross having an end directable tangentially at said region of said array, and mechanism for directing said end tangentially at said region.

* * * * *